Aug. 14, 1956    R. H. GLEASON    2,758,877
APPARATUS FOR DISPENSING MATERIALS
Filed Dec. 6, 1954
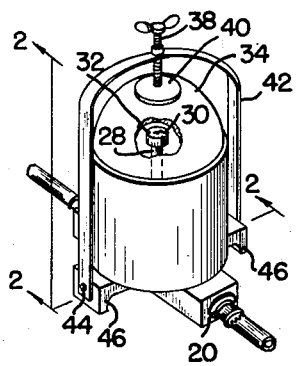
FIG.-1
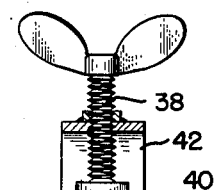
FIG.-2
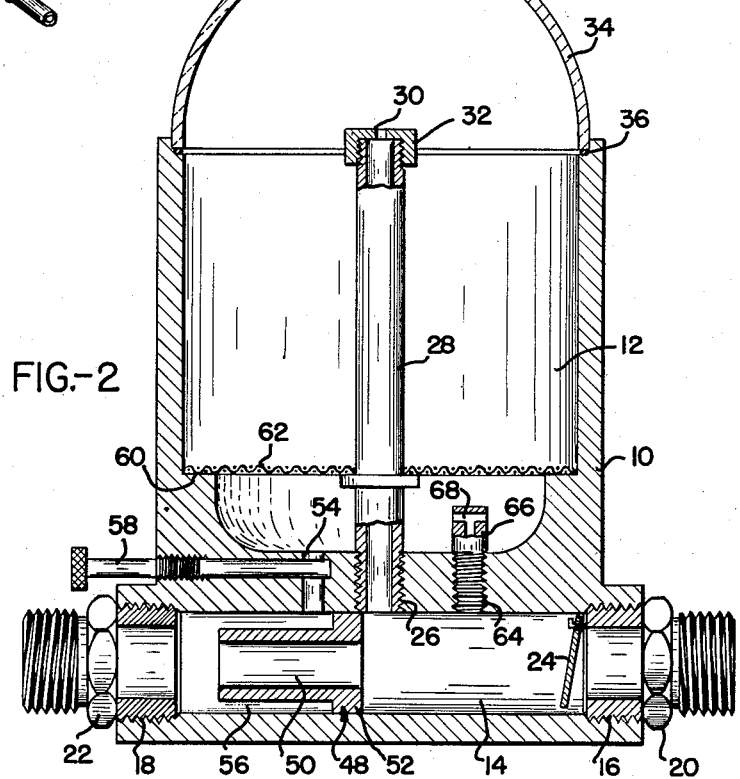
FIG.-3
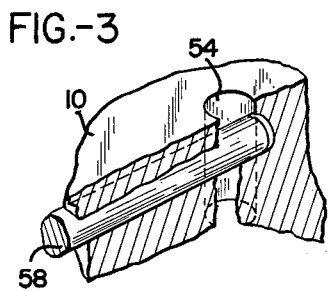
INVENTOR.
ROBERT H. GLEASON
BY Toulmin & Toulmin
ATTORNEYS United States Patent Office 2,758,877
Patented Aug. 14, 1956

2,758,877

APPARATUS FOR DISPENSING MATERIALS

Robert H. Gleason, Van Wert, Ohio

Application December 6, 1954, Serial No. 473,163

6 Claims. (Cl. 299—84)

This invention relates to an apparatus for dispensing materials such as fertilizers and like materials, and is particularly directed to an apparatus for dispensing such materials when they are of a soluble nature, but is not limited to the handling of soluble material and can also be practiced in connection with inert materials which are of a fine granular nature.

The present invention represents a further extension of the inventive thought and a refinement of the method and apparatus disclosed in my previously issued Patent No. 2,239,502.

In the dispensing of fertilizers and the like, one of the preferred ways of dispensing the material is to entrain it in a stream of water. This usually dissolves the fertilizer so that it is applied uniformly, and is also applied in such a manner that it will soak into the soil and be in the most ideal condition for being absorbed by the plant life, and also in such condition that it is not apt to cause burned spots in the area being treated.

Most fertilizer mixtures, however, include ingredients of varying solubility and, in some cases, some of the ingredients could be considered to be relatively insoluble.

In the ordinary dispensing device for causing fertilizer materials to become entrained in a stream of water, no provision is made for handling fertilizer materials of that nature. For example, in my previously issued patent referred to above the material to be dispensed was placed in a fabric hammock or the like. This absolutely required the material to be dissolved before it passed into the stream of water in which it was to be entrained.

Certain other devices known in the art require that the material being dispensed be first dissolved in the water and then drawn upwardly through a tube, somewhat in the nature of a spray gun, and inducted into the water spray. This arrangement also makes no provision for moving inert or insoluble material from the dispenser into the water stream.

Having the foregoing in mind, it is a primary object of this invention to provide a dispensing apparatus of the nature referred to, and a method of operation thereof, in which substantially any materials, either soluble or insoluble so long as they are of a flowable nature, can be dispensed by entraining them in a water stream at a uniform rate.

A further provision of the present invention is the provision of a relatively inexpensive dispensing apparatus of the nature referred to which is fully automatic in operation.

Another object of the present invention is the provision of an automatic dispensing apparatus of the nature referred to in which the rate of dispensing of the material can readily be varied from maximum to zero.

A still further particular object of this invention is the provision of a dispensing apparatus of the nature referred to which can be inserted in the water line and which utilizes the movement of the water through the line for dispensing the material into the water stream.

Another particular object of the present invention is the provision of a dispensing apparatus of the nature referred to in which the operation of the device can readily be observed at all times so that when the supply of material in the device is exhausted it can be refilled, and also so that it can be observed at all times as to whether or not the device is operating properly.

A still further object of this invention is the provision of a device of the nature referred to characterized in that the device can readily be machined by conventional practices and by conventional machines without the use of complicated fasteners or jigs and without resorting to expensive techniques.

These and other objects and advantages of this invention will become more apparent upon reference to the following specification, taken in connection with the accompanying drawings, in which:

Figure 1 is a perspective view showing a device according to my invention;

Figure 2 is a vertical section indicated by line 2—2 on Figure 1; and

Figure 3 is a fragmentary perspective view showing a regulating needle valve and its association with a passage in the device.

Referring to the drawings somewhat in more detail and in particular to Figures 1 and 2, the device according to this invention will be seen to comprise the main body part 10 which may advantageously be a casting of aluminum or aluminum alloy. Body part 10 is provided with an upper chamber 12 and a lower transverse passageway 14. Transverse passageway 14 has threaded end parts 16 and 18 for receiving, respectively, the fittings 20 and 22, to which can be connected hoses or pipes for supplying water to passageway 14 from right to left as it is viewed in Figure 2.

Fitting 20 advantageously includes the flapper-type check valve 24, which not only prevents any reverse flow through the device, but also absolutely prevents operation thereof if accidentally connected backwards in the water line.

On the axis of body 10 is a tapped hole 26 connecting chamber 12 with passage 14, and threaded into tap hole 26 is a length of pipe or tubing 28 that extends upwardly to about the top of body part 10 where it is provided with one or more fairly small orifices 30, which may be formed directly in the tube, if the end of the tube is closed, or which may be, as shown, located in a closed end cap 32.

The upper open end of body part 10 is closed by a transparent dome member 34 of glass or plastic which seats on a gasket 36 and which is retained in sealing engagement with body part 10 by means of clamp screw 38, pad 40 on the lower end thereof, and yoke member 42 through which the screw is threaded, and which yoke member is pivoted at its opposite ends at 44 to the sides of the body part 10. The regions of the body part receiving the pivot means 44 may also comprise foot portions 46 which, in cooperation with the transverse portion of the body part 10 within which the passage 14 is located, provides a supporting base for the device.

Turning again to Figure 2, immediately leftwardly of the lower end of the pipe or tube 28 in passage 14 is a sleeve or tubuluar element 48 having a bore 50 therethrough substantially smaller than passage 14 and having an enlarged end part 52 thereon which is of a size to form a pressed fit with passage 14.

Also, leftwardly of pipe or tube 28 and leftwardly of enlarged end part 52 of the element 48, is a bore or passage 54 communicating with chamber 12 and body part 10 and with the space in passage 14 around the reduced diameter part 56 of element 48.

A needle valve arrangement consisting of screw 58 threaded into body part 10 and having an end part adapted for intersecting bore 54 is adapted for adjustment between a wide open position of bore 54 and a position where the bore is completely closed.

Toward the bottom of chamber 12 in the body of the device, the said body comprises a shoulder 60 on which rests the screen 62 which may be in the form of a screen proper consisting of interwoven wires, or which may be a perforated plate; in either case, preferably stainless steel or non-corrosive bronze or aluminum alloy.

Rightwardly of the axis of body part 10 is another bore 64 which is threaded and in which is mounted a jet element 66 having a small passage means 68 therein.

In operating the device, the transparent dome 34 is removed when the supply of material to be dispensed is placed in chamber 12 so as to be supported on screen 62. This material may be in the form of pellets, granules, or fine powder, or may even be in liquid form; although in case of a liquid it is preferable for the element 66 to be closed or eliminated.

After the material has been placed in chamber 12 the dome 34 is replaced and clamped in position, and water is supplied through fitting 20 to passage 14 and removed from the device through fitting 22.

The pressure created in passage 14 by the restriction offered therein by element 48 causes water to flow upwardly through pipe or tube 28 and spray at the upper end thereof, whence the water will drain downwardly through the material in chamber 12 and through screen 62 to bore 54. The aqueous solution, if the material is soluble, suspension if it is insoluble, or mixture if it is both soluble and insoluble, will pass downwardly through bore 54 at a rate dependent on the seating of screw 58 to the space about reduced diameter portion 56 of element 48, whence it will be inducted into the flow of water passing through bore 50 of element 48 and thence through fitting 22 to the outlet hose or conduit.

It will also be appreciated that there will also be a jet action caused by the water issuing from the left end of element 48 that will produce a pressure drop in the region surrounding the sleeve element to further induce the movement of the material from chamber 12 into the water stream. In any case, the rate at which the material is dispensed will be determined by the setting of the adjustment screw 58.

As has been mentioned previously, the apparatus of the present invention is capable of handling totally inert or substantially insoluble material so long as the material is fine enough to pass through the screen 62. Since fine material of this nature would tend to bridge up at the passage 54 I have found that the agitation of the liquid in chamber 12 beneath the screen 62 created by the jet element 66 is essential when material of this nature is being handled.

What the jet element 66 does is to create at least a small amount of turbulence or agitation in the lower part of chamber 12 beneath screen 62 which prevents articulate material from stopping up passage 54. When the material being dispensed is completely soluble, or is a liquid, the said jet can be eliminated, but for all practical purposes, since the jet is essentially small, it can be left open at all times; even when the liquid is placed in chamber 12 there will be only a negligible amount thereof passing downwardly through the jet element 66, and this will only occur when there is no water flow through passage 14.

The device illustrated in the drawings in this application is adapted for receiving from two to four pounds of dry granular material to be dispensed, but it will be understood that the device could be made of any size. It is contemplated that the device will be constructed to handle a substantially larger quantity of material.

In any case, the same features of construction would obtain with a portion of the water passing through the device being by-passed through the chamber, and with the material therein again being inducted into the flow of fluid through the device.

A feature of my invention is the ready machinability of the body part of the device. This member is preferably a casting, and all of the bores therein, the holes to be tapped, and other surfaces to be finished, can be machined in conventional tools, such as drill presses, by placing the body part in a simple jig or fixture. It will be noted that all of the said surfaces and bores are at right angles to each other.

It will be understood that this invention is susceptible to modification in order to adapt it to different usages and conditions and, accordingly, it is desired to comprehend such modifications within this invention as may fall within the scope of the appended claims.

I claim:

1. In a device for dispensing materials into a liquid stream; a body having a cavity therein open at the top, a transparent cover closing the open end of the cavity and forming therewith a chamber, a liquid flow passage through said body beneath said cavity, bores spaced along the axis of said passage leading from said passage into said cavity, the downstream one of said bores opening into the bottom of said cavity, a restrictor element in the passage having an end part press-fitting the passage between the bores and a sleeve part smaller than the passage extending to beyond the said downstream one of said bores, pipe means fitted in the upstream one of said bores and extending upwardly in said cavity to the region of the top thereof, a nozzle in the upper end of the pipe so the spray therefrom is visible through said cover, and agitator jet means in the lower part of said cavity supplied from said passage means upstream of said restrictor element to agitate material in the bottom of said cavity.

2. An arrangement according to claim 1 in which there is a perforate support member in the cavity above the said jet means but below the nozzle to support material in the cavity which is to be dispensed into the liquid stream.

3. In a device for dispensing materials into a liquid stream; a body having a cavity therein open at the top, a transparent cover closing the open end of the cavity and forming therewith a chamber, a liquid flow passage through said body beneath said cavity, bores spaced along the axis of said passage connecting said passage with said cavity, a restrictor element separate from the body in the passage having an end part fitting the passage between the bores and a sleeve part smaller than the passage extending to beyond the downstream one of said bores, a perforate element in the cavity in the region of the bottom thereof to support material to be dispensed by the device, pipe means extending from the upstream one of said bores through said perforate means to the region of the upper end of said cavity so the supply of liquid to said material is above the material, and jet means opening from upstream of said restrictor element into said cavity beneath said perforate member to agitate material in the bottom of the cavity.

4. An arrangement according to claim 3 in which the said jet means is laterally directed in the cavity beneath the perforate element therein whereby to agitate granular material in the bottom of the cavity so it will pass through the said downstream one of said bores.

5. An arrangement according to claim 1 in which there is a valve member screw-threaded into the body so as to intersect the said downstream bore adjustable for varying the effective area thereof from zero to a maximum.

6. In a dispensing device of the nature referred to; a body having a cavity therein open at the top, a transparent dome sealingly closing said opening, a flow passage through the body beneath said cavity, bores connecting said cavity with said passage spaced axially along said passage, a restrictor element fitted into the passage having an end part fitting the passage between the bores and a sleeve part smaller in diameter than the passage extending to beyond the downstream one of said bores, a pipe extending from the upstream one of said bores to the region of the upper end of said cavity, fittings in the opposite ends of said passage to connect conduits to the body to pass water therethrough, and a check valve on the inner end of the upstream one of said fittings opening inwardly of said passage.

References Cited in the file of this patent

UNITED STATES PATENTS

| | | |
|---|---|---|
| 1,738,839 | McClintock | Dec. 10, 1929 |
| 2,061,500 | Brewer | Nov. 17, 1936 |
| 2,239,502 | Gleason | Apr. 22, 1941 |
| 2,477,998 | McCowan | Aug. 2, 1949 |
| 2,513,567 | Kent | July 4, 1950 |
| 2,599,678 | Walker | June 10, 1952 |
| 2,613,994 | Peters | Oct. 14, 1952 |